US012789619B2

(12) United States Patent
Yahata et al.

(10) Patent No.: US 12,789,619 B2
(45) Date of Patent: Nov. 10, 2026

(54) UTILITY VEHICLE

(71) Applicant: Kubota Corporation, Osaka (JP)

(72) Inventors: Miharu Yahata, Sakai (JP); Akira Tominaga, Sakai (JP); Tsuyoshi Hirai, Sakai (JP)

(73) Assignee: Kubota Corporation, Osaka (JP)

( * ) Notice: Subject to any disclaimer, the term of this patent is extended or adjusted under 35 U.S.C. 154(b) by 137 days.

(21) Appl. No.: 18/979,714

(22) Filed: Dec. 13, 2024

(65) Prior Publication Data

US 2025/0313081 A1 Oct. 9, 2025

(51) Int. Cl.

*B60K 13/04* (2006.01)
*B62D 63/04* (2006.01)
*F01N 13/18* (2010.01)

(52) U.S. Cl.

CPC .............. *B60K 13/04* (2013.01); *B62D 63/04* (2013.01); *F01N 13/1805* (2013.01)

(58) Field of Classification Search

CPC ........ B60K 13/04; B60K 13/00; B62D 63/04; B62D 63/02; B62D 63/00; F01N 13/1805; F01N 13/18; F01N 13/1822; F01N 13/00; F01N 13/082; F01N 13/08; F01N 1/00; F01N 2340/00; F01N 2340/02; F01N 2340/04

See application file for complete search history.

(56) References Cited

U.S. PATENT DOCUMENTS 7,856,814 B2 * 12/2010 Nakagome .............. F01N 1/083 60/312
8,091,670 B2 * 1/2012 Suzuki ................... B60K 13/04 180/89.1
8,215,443 B2 * 7/2012 Miura ................ F01N 13/1805 180/309
8,550,204 B2 * 10/2013 Takagi .................... F01N 13/08 180/89.2
8,910,472 B2 * 12/2014 Takahashi ............... F01N 13/14 180/291
9,050,887 B2 * 6/2015 Takahashi ........... F01N 13/1822
9,358,876 B2 * 6/2016 Hanashima ......... F01N 13/1822
9,470,134 B2 * 10/2016 Hirukawa .............. B60K 13/04
9,512,771 B2 * 12/2016 Mahira ................. F01N 13/007
9,889,736 B2 * 2/2018 Yamada ................ F01N 13/008
10,406,911 B2 * 9/2019 Oba ...................... B62D 21/183
10,724,420 B2 * 7/2020 Momosaki .......... F01N 13/1805
11,708,787 B2 * 7/2023 Jyozaki .................. B60K 13/02 123/559.1

(Continued)

FOREIGN PATENT DOCUMENTS

JP 6655970 B2 3/2020

*Primary Examiner* — James M Dolak
(74) *Attorney, Agent, or Firm* — The Webb Law Firm

(57) ABSTRACT

A utility vehicle includes an exhaust duct cover covering both a plurality of upstream exhaust duct sections and a downstream exhaust duct section and including two exhaust duct cover segments; a first support attached to the plurality of upstream exhaust duct sections; a second support attached to the downstream exhaust duct section; a first fastening band fastening the exhaust duct cover segments to the first support; a second fastening band fastening the exhaust duct cover segments to the second support; a muffler connected to the downstream exhaust duct section; and a muffler cover covering the muffler and including two muffler cover segments.

7 Claims, 9 Drawing Sheets

(56) References Cited

U.S. PATENT DOCUMENTS

| | | | | |
|---|---|---|---|---|
| 11,919,587 | B2 * | 3/2024 | Jyouzaki | B60K 13/02 |
| 12,214,654 | B2 * | 2/2025 | Purdy | B60K 13/04 |
| 12,320,416 | B2 * | 6/2025 | Shimatani | F16H 57/027 |
| 12,377,725 | B2 * | 8/2025 | Nakano | B62D 23/005 |
| 2017/0001508 | A1 | 1/2017 | Bessho et al. | |

* cited by examiner

UTILITY VEHICLE

CROSS-REFERENCE TO RELATED APPLICATION

This application claims priority to Japanese Patent Application No. 2024-061329 filed Apr. 5, 2024, the disclosure of which is hereby incorporated by reference in its entirety.

BACKGROUND OF THE INVENTION

Field of the Invention

The present invention relates to a utility vehicle.

Description of Related Art

Japanese Patent No. 6655970 discloses a utility vehicle including a cargo box at a back portion of the vehicle body, an engine below the cargo box, and an exhaust duct including (i) two or more upstream exhaust duct sections each extending from an exhaust section of the engine widthwise relative to the vehicle body and (ii) a downstream exhaust duct section disposed backward of the upstream exhaust duct sections, extending lengthwise relative to the vehicle body, and merging the upstream exhaust duct sections with each other. The exhaust duct serves to discharge exhaust gas from the engine.

The above utility vehicle includes an exhaust duct cover attached to and held by the exhaust duct to cover the exhaust duct. The exhaust duct cover serves to reduce the amount of heat transferred from the exhaust duct to the cargo box above the exhaust duct and engine accessories around the exhaust duct. Conventional exhaust duct covers include two or more separate cover segments for the individual upstream exhaust duct sections. The attachment of such an exhaust duct cover is troublesome. Further, while conventional exhaust duct covers may be bolted, strong vibrations to the exhaust tube may loosen the bolts.

SUMMARY OF THE INVENTION

The present invention provides a utility vehicle including an exhaust duct cover that is easily attachable to the exhaust duct and that is not loosened easily.

A utility vehicle according to the present invention includes: a body of the utility vehicle; a cargo box at a back portion of the body; an engine below the cargo box; an exhaust duct including: a plurality of upstream exhaust duct sections each extending from an exhaust section of the engine along a width of the body; and a downstream exhaust duct section disposed backward of the plurality of upstream exhaust duct sections, extending in a front-back direction relative to the body, and merging the plurality of upstream exhaust duct sections with each other, the exhaust duct being configured to discharge exhaust gas from the engine; an exhaust duct cover covering both the plurality of upstream exhaust duct sections and the downstream exhaust duct section and including two exhaust duct cover segments opposite to each other across a diameter of each of the plurality of upstream exhaust duct sections and the downstream exhaust duct section; a first support attached to the plurality of upstream exhaust duct sections and supporting the exhaust duct cover segments from inward; a second support attached to the downstream exhaust duct section and supporting the exhaust duct cover segments from inward; a first fastening band around respective portions of the exhaust duct cover segments which portions correspond to the first support, the first fastening band fastening the exhaust duct cover segments to the first support; a second fastening band around respective portions of the exhaust duct cover segments which portions correspond to the second support, the second fastening band fastening the exhaust duct cover segments to the second support; a muffler connected to the downstream exhaust duct section; and a muffler cover covering the muffler and including two muffler cover segments.

With the above configuration, simply attaching two exhaust duct cover segments to the upstream exhaust duct sections and the downstream exhaust duct section attaches the exhaust duct cover to the exhaust duct. A slight effort of simply attaching two exhaust duct cover segments allows the exhaust duct cover to be easily attached to the exhaust duct.

Fastening the exhaust duct cover segments to the first support with use of a first fastening band and to the second support with use of a second fastening band fixes the exhaust duct cover to the exhaust duct. The above configuration, in other words, uses first and second fastening bands as fixing means that is not loosened easily. This allows the exhaust duct cover to be attached to the exhaust duct in such a manner that the exhaust duct cover is not loosened easily.

The utility vehicle may preferably be configured such that a first one of the muffler cover segments is integral with a first one of the exhaust duct cover segments, and a second one of the muffler cover segments is integral with a second one of the exhaust duct cover segments.

The utility vehicle may preferably further include: a third support attached to an exhaust port of the muffler and supporting the muffler cover segments from inward; and a third fastening band around respective portions of the muffler cover segments which portions correspond to the third support, the third fastening band fastening the muffler cover segments to the third support.

The above configuration allows (i) the first exhaust duct cover segment to be attached together with the first muffler cover segment, (ii) the second exhaust duct cover segment to be attached together with the second muffler cover segment, and (iii) the two muffler cover segments to be fastened to the third support with use of the third fastening band. This in turn allows the muffler cover to be attached to the muffler with less time and effort in such a manner that the muffler cover is not loosened easily.

The utility vehicle may preferably be configured such that a first one of the exhaust duct cover segments covers the plurality of upstream exhaust duct sections and the downstream exhaust duct section from above, and a second one of the exhaust duct cover segments covers the plurality of upstream exhaust duct sections and the downstream exhaust duct section from below.

The above configuration allows the exhaust duct cover to be easily attached to the exhaust duct, as it allows the user to place (i) one of the exhaust duct cover segments above the upstream and downstream exhaust duct sections through an easily securable work space above the upstream and downstream exhaust duct sections and (ii) the other exhaust duct cover segment below the upstream and downstream exhaust duct sections through an easily securable work space below the upstream and downstream exhaust duct sections.

The utility vehicle may preferably be configured such that the plurality of upstream exhaust duct sections are arranged vertically.

With the above configuration, the exhaust duct cover segments have a small horizontal dimension and are easily handleable, as compared to the case of including two or more upstream exhaust duct sections arranged horizontally, thereby facilitating the attachment of the exhaust duct cover to the exhaust duct.

The utility vehicle may preferably be configured such that the muffler is configured to clean the exhaust gas.

The above configuration allows the muffler cover to be attached to the exhaust gas cleaning muffler with less time and effort in such a manner that the muffler cover is not loosened easily.

The utility vehicle may preferably be configured such that the exhaust duct cover covers a portion of the exhaust duct which portion is downstream of respective intermediate portions of the plurality of upstream exhaust duct sections.

DESCRIPTION OF THE INVENTION

The description below deals with an example embodiment of the present invention with reference to drawings.

Figure 1:
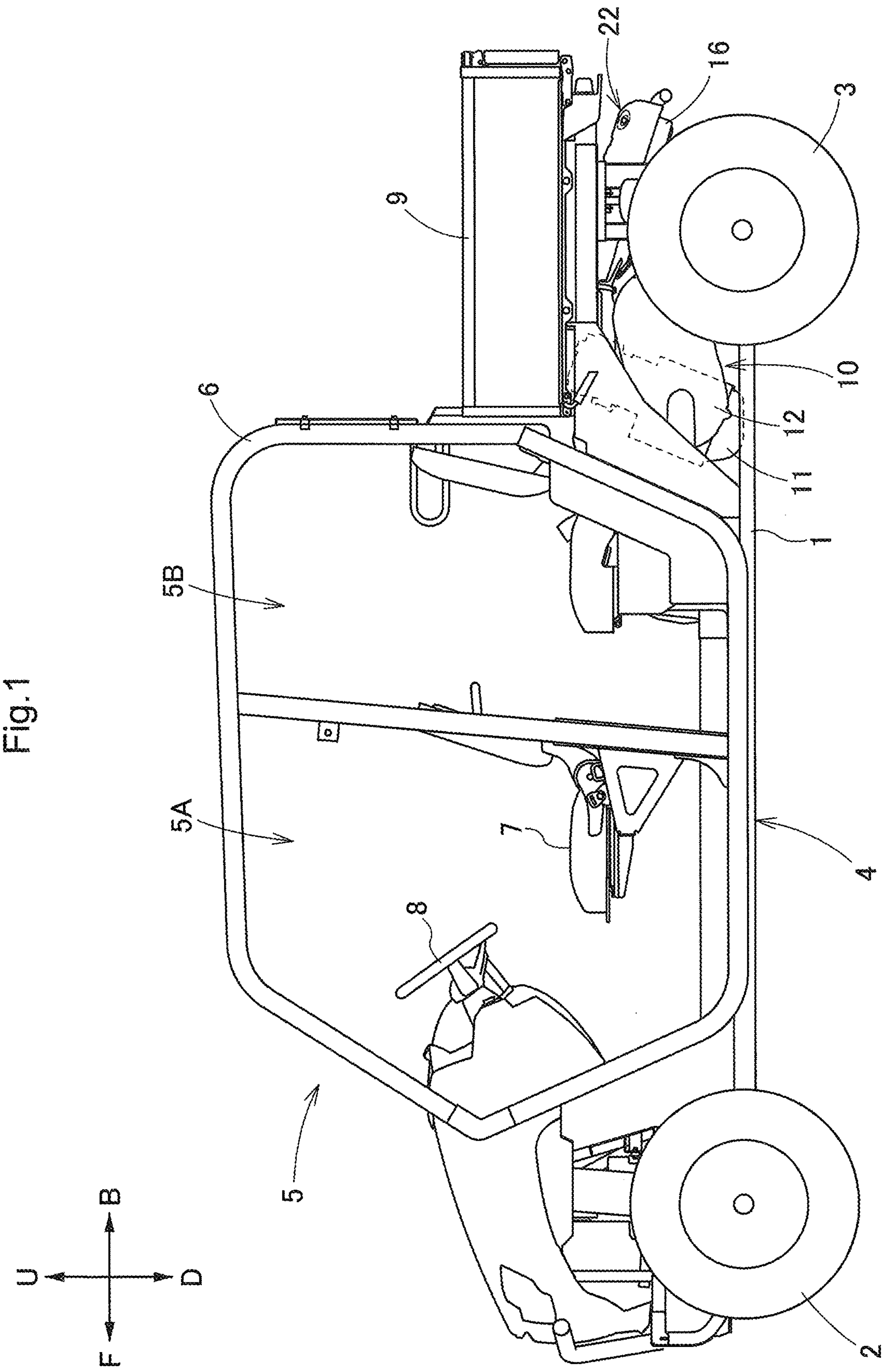
FIG. 1 is a left side view of a utility vehicle.
Figure 2:
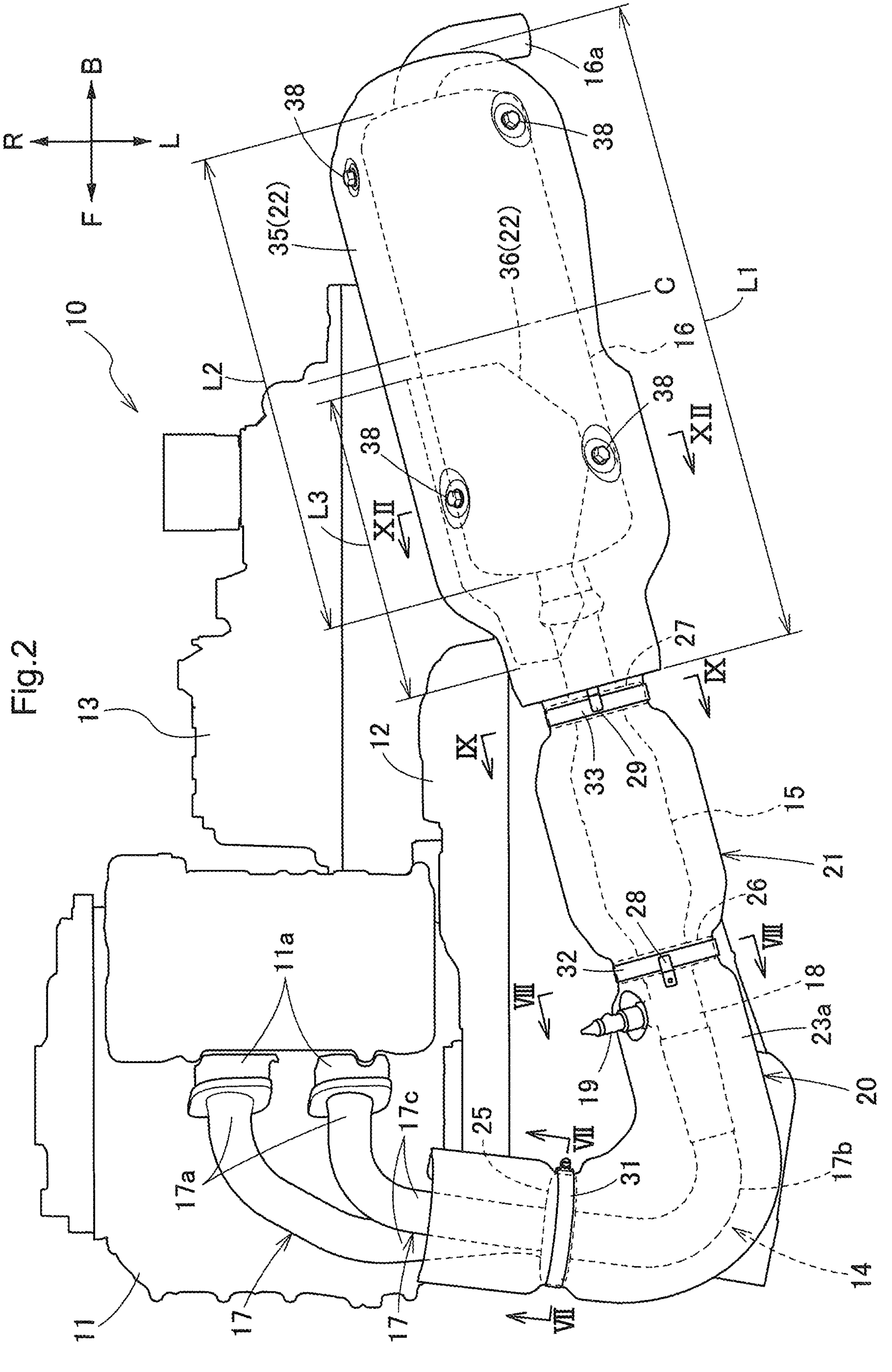
FIG. 2 is a plan view of an exhaust duct cover, a first muffler cover, and a second muffler cover.
Figure 3:
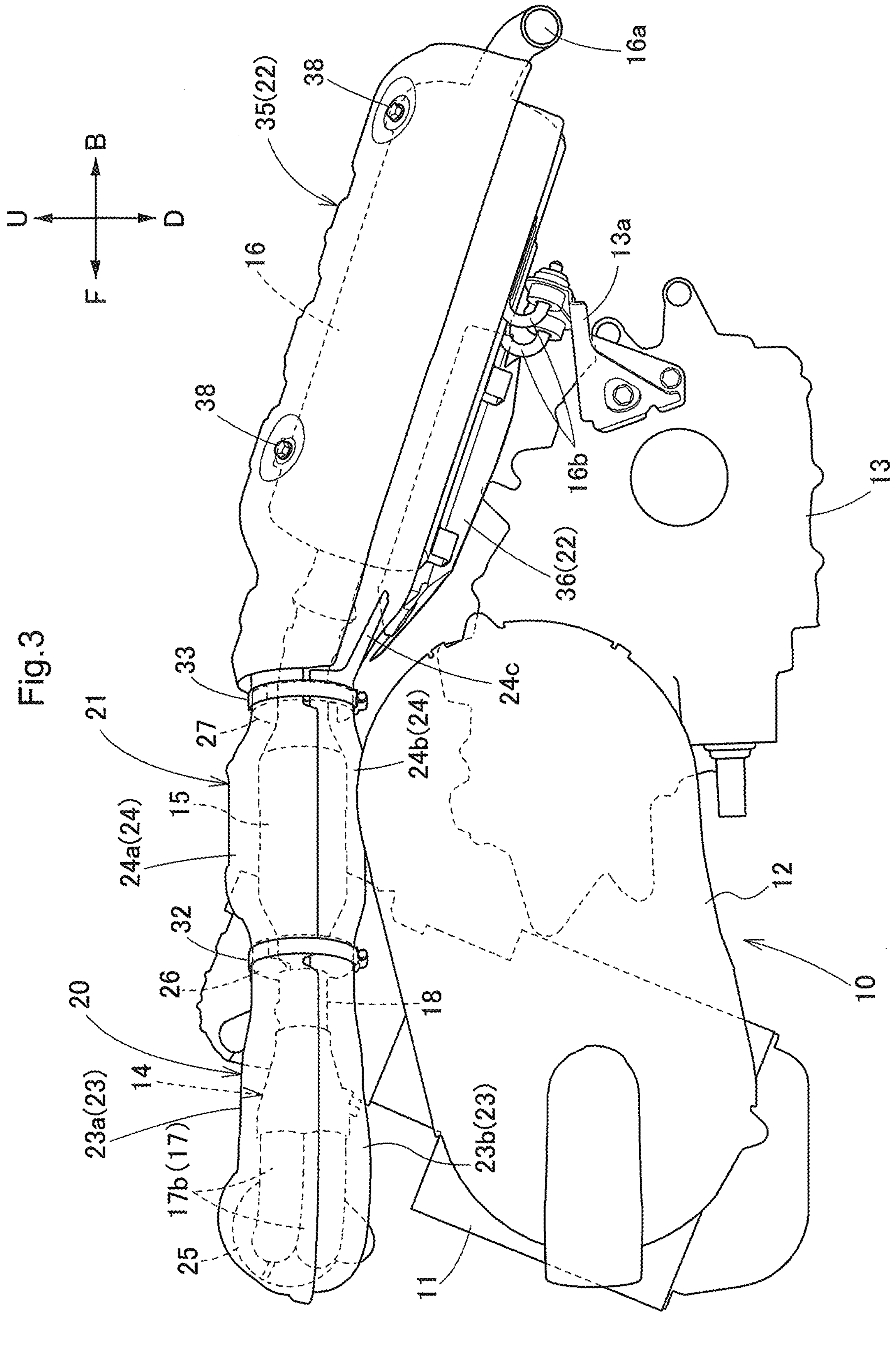
FIG. 3 is a left side view of an exhaust duct cover, a first muffler cover, and a second muffler cover.

The embodiment described below is a utility vehicle. FIGS. 1 to 3 show arrow F to indicate the forward direction relative to the vehicle body and arrow B to indicate the backward direction relative to the vehicle body. FIGS. 1 and 3 show arrow U to indicate the upward direction relative to the vehicle body and arrow D to indicate the downward direction relative to the vehicle body. FIG. 2 shows arrow L to indicate the leftward direction relative to the vehicle body, which corresponds to the front side of FIG. 1, and arrow R to indicate the rightward direction relative to the vehicle body, which corresponds to the back side of FIG. 1. The lateral direction relative to the body corresponds to the width of the vehicle body.

Overall Configuration of Utility Vehicle

FIG. 1 illustrates a utility vehicle for multiple purposes such as cargo transport and recreation. The utility vehicle includes a body frame 1, a pair of left and right front wheels 2, a pair of left and right rear wheels 3, and a body 4. The front wheels 2 are held by a front portion of the body frame 1, and are turnable and drivable. The rear wheels 3 are held by a back portion of the body frame 1, and are drivable. The utility vehicle includes a driver section 5 disposed at a portion of the body 4 which portion is between the front wheels 2 and the rear wheels 3. The driver section 5 includes a front driver section 5A, a back driver section 5B, and a roll-over protective structure (ROPS) 6 that defines respective driver spaces of the front and back driver sections 5A and 5B. The front driver section 5A includes a driver's seat 7 and a steering wheel 8 for use to change the direction of the front wheels 2. The utility vehicle includes a cargo box 9 and a motor section 10 at a back portion of the body.

Motor Section

The motor section 10 is, as illustrated in FIG. 1, below the cargo box 9 and, as illustrated in FIGS. 2 and 3, includes an engine 11, a continuously variable transmission device 12, and a transmission 13. The continuously variable transmission device 12 is configured to receive motive power from the engine 11 and continuously vary the motive power. The transmission 13 is configured to receive motive power from the continuously variable transmission device 12, adjust the motive power with use of gears, and transmit the resulting motive power to the front and rear wheels 2 and 3. The continuously variable transmission device 12 is coupled to respective lateral portions of the engine 11 and the transmission 13. The continuously variable transmission device 12 includes an endless rotary belt (not illustrated in the drawings) and belt pulleys (not illustrated in the drawings) each with an adjustable belt winding diameter to vary received motive power. The transmission 13 is backward of the engine 11.

As illustrated in FIG. 2, the motor section 10 includes an exhaust duct 14 extending from the engine 11, a first muffler 15 connected to the exhaust duct 14, and a second muffler 16 connected to the first muffler 15. As illustrated in FIG. 3, the second muffler 16 includes two attachment sections **16*b* at a lower back portion. The transmission 13 includes a support 13*a* with which the attachment sections 16*b* are locked. The transmission 13 holds a back portion of the second muffler 16. The engine 11 discharges exhaust gas through the exhaust duct 14 into the first muffler 15, which cleans the exhaust gas with use of a catalyst and discharges the resulting exhaust gas into the second muffler 16, which discharges the exhaust gas through a discharge cylinder 16*a* (see FIGS. 2 and 3**) while muffling exhaust noise.

Exhaust Duct

Figure 4:
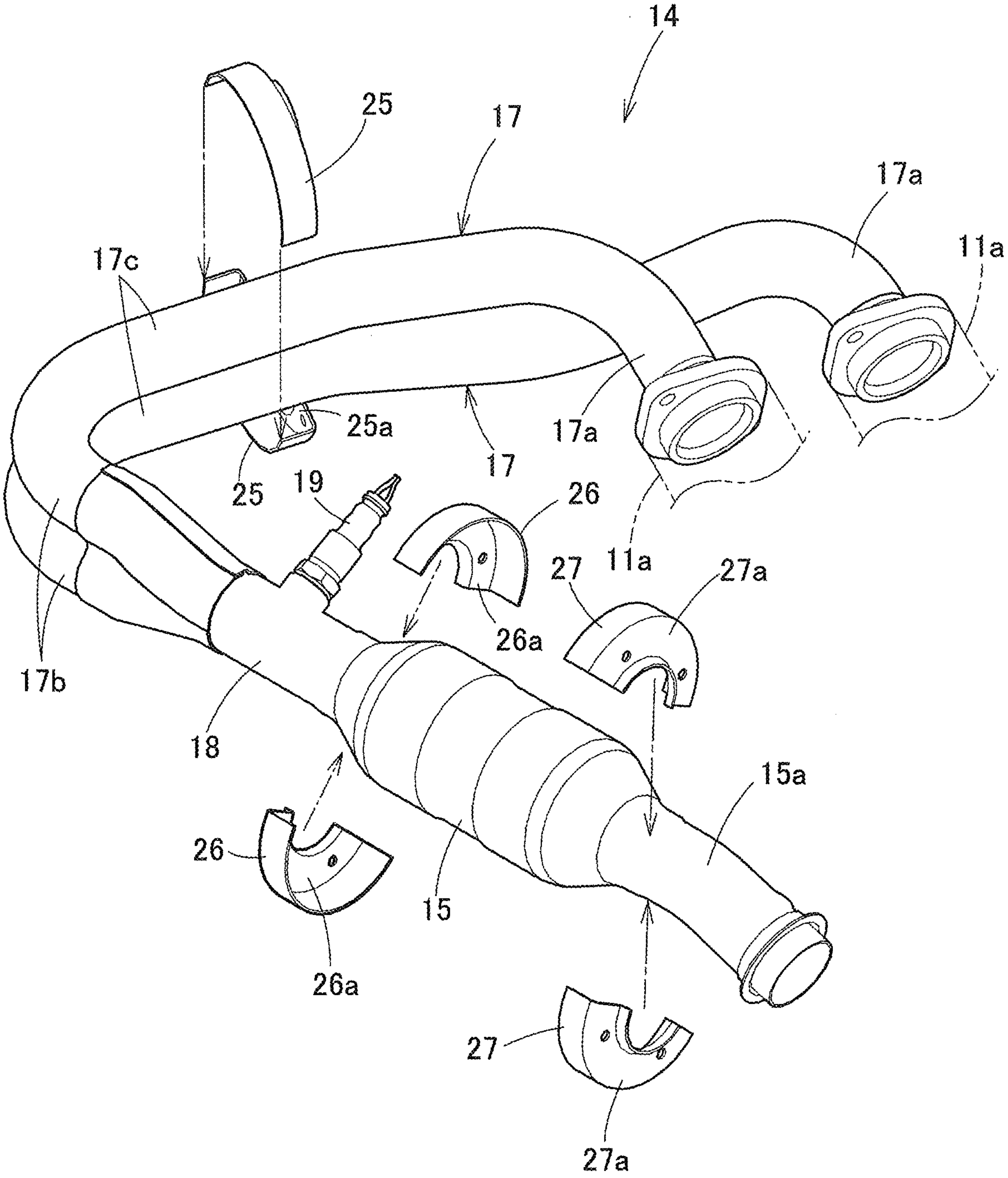
FIG. 4 is a perspective view of an exhaust duct and a first muffler.

The exhaust duct 14, as illustrated in FIGS. 2 and 4, includes (i) two upstream exhaust duct sections 17 connected to respective exhaust sections **11*a* of the engine 11 and (ii) a downstream exhaust duct section 18 merging the upstream exhaust duct sections 17 with each other and connecting the upstream exhaust duct sections 17 to the first muffler 15 and provided with a $CO_2$ sensor 19 configured to detect carbon dioxide discharged from the engine 11**.

The upstream exhaust duct sections 17 extend from the respective exhaust sections **11*a* forward relative to the body, then leftward relative to the body along its width, and then backward relative to the body in the front-back direction (hereinafter referred to as "lengthwise") relative to the body to reach the downstream exhaust duct section 18. The upstream exhaust duct sections 17 are arranged vertically relative to the body. The upstream exhaust duct sections 17, specifically, each include (i) a starting end portion 17*a* and a terminal end portion 17*b* each extending lengthwise relative to the body and (ii) an intermediate portion 17*c* interposed between the starting and terminal end portions 17*a* and 17*b* and extending widthwise relative to the body. The intermediate portion 17*c* and terminal end portion 17*b* of each upstream exhaust duct section 17 are arranged vertically relative to the body. The upstream exhaust duct sections 17** may alternatively be arranged lengthwise or widthwise relative to the body.

As illustrated in FIG. 3, the downstream exhaust duct section 18 is backward of the upstream exhaust duct sections 17 and extends lengthwise relative to the body.

Exhaust Duct Cover and First Muffler Cover

Figure 11:
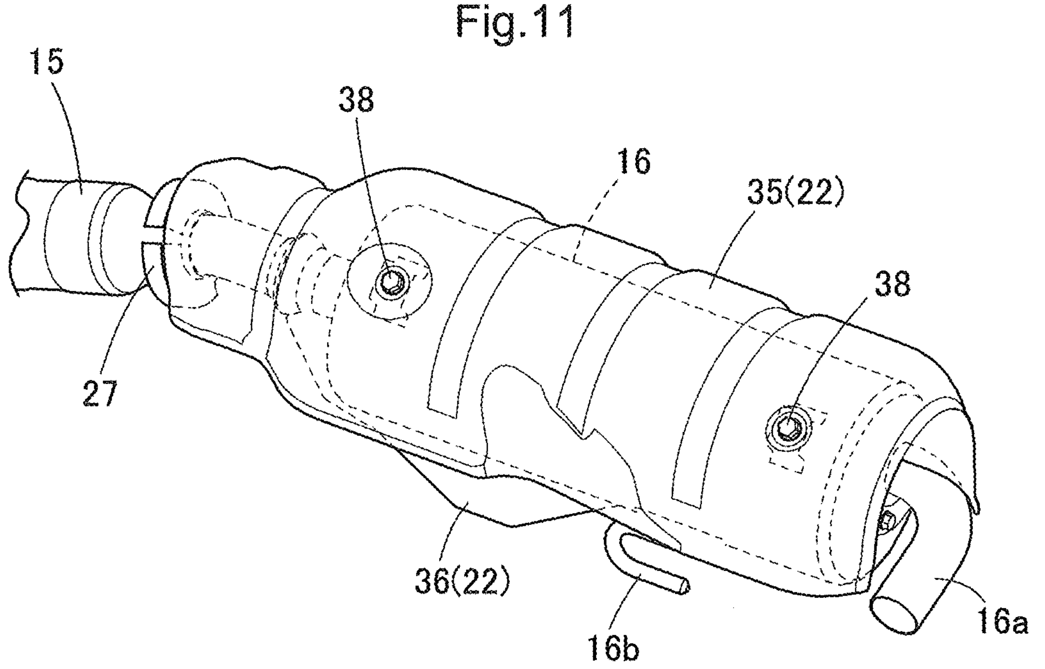
FIG. 11 is a perspective view of an upper cover segment and a lower cover segment as attached.

As illustrated in FIGS. 2 and 3, the motor section 10 includes an exhaust duct cover 20 covering the exhaust duct 14 and configured to reduce the amount of heat that the exhaust duct 14 dissipates and that is transferred to, for example, the cargo box 9. The motor section 10 includes a first muffler cover 21 covering the first muffler 15 and configured to reduce the amount of heat that the first muffler 15 dissipates and that is transferred to, for example, the cargo box 9. As illustrated in FIGS. 2, 3, and 11, the motor section 10 includes a second muffler cover 22 covering the second muffler 16 and configured to reduce the amount of heat that the second muffler 16 dissipates and that is transferred to, for example, the cargo box 9.

As illustrated in FIGS. 2 and 3, the exhaust duct cover 20, which covers the exhaust duct 14, covers both the upstream exhaust duct sections 17 and the downstream exhaust duct section 18. The exhaust duct cover 20 for the present embodiment covers only the intermediate portion 17*c* and terminal end portion 17*b* of each upstream exhaust duct section 17 and the entire downstream exhaust duct section 18. The exhaust duct cover 20 may alternatively cover the entire upstream exhaust duct sections 17.

Figure 5:
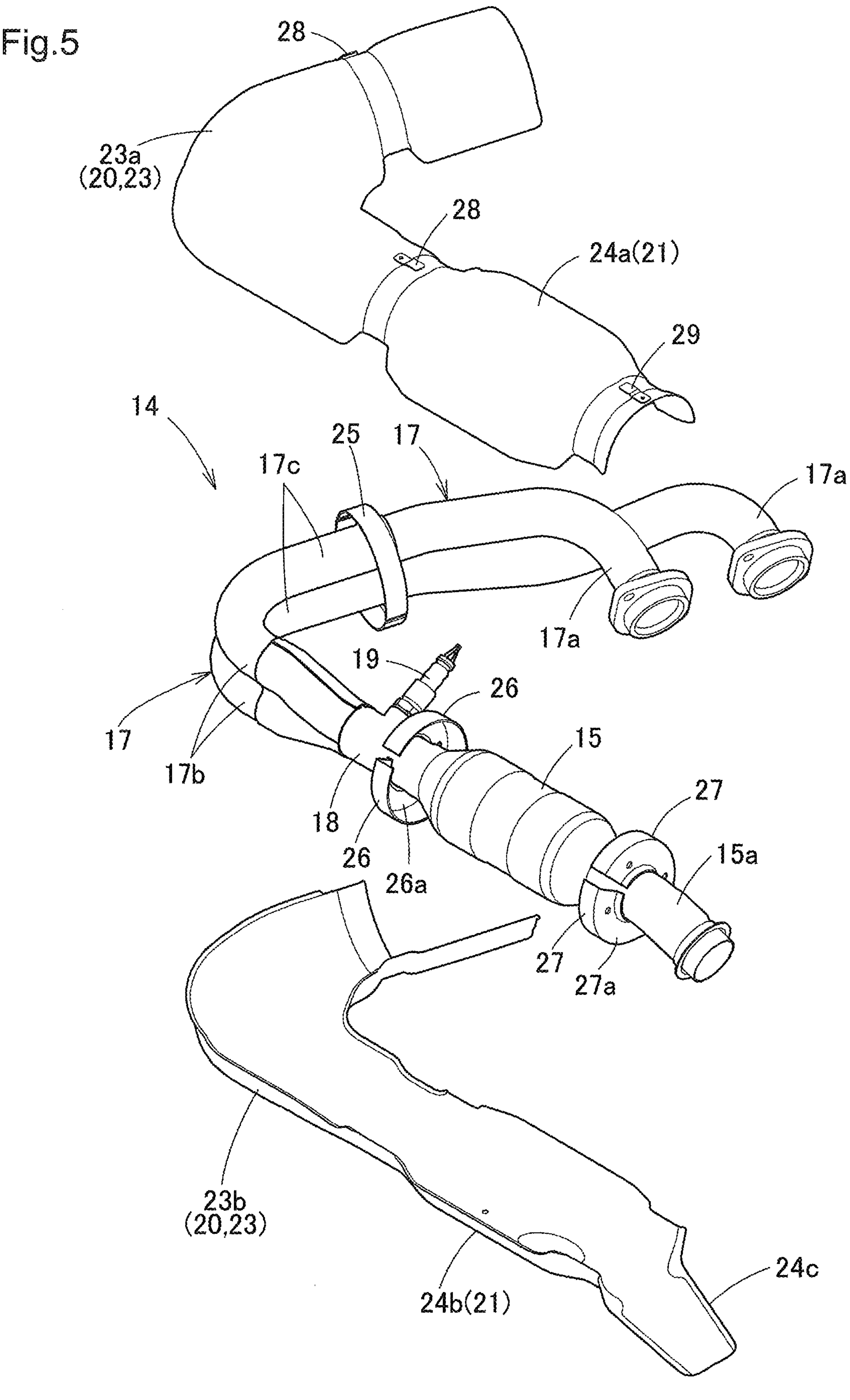
FIG. 5 is a perspective view of a first exhaust duct cover segment and a second exhaust duct cover segment as detached.

The exhaust duct cover 20, as illustrated in FIGS. 3 and 5, includes two exhaust duct cover segments 23 opposite to each other across the diameter of each of the upstream exhaust duct sections 17 and the downstream exhaust duct section 18. The exhaust duct cover 20 for the present embodiment includes a pair of upper and lower exhaust duct cover segments 23 opposite to each other across the diameter of each of the upstream exhaust duct sections 17 and the downstream exhaust duct section 18.

The description below assumes that the exhaust duct cover 20 includes a first exhaust duct cover segment 23*a* and a second exhaust duct cover segment 23*b*.

As illustrated in FIG. 3, the first exhaust duct cover segment 23*a* covers the upstream and downstream exhaust duct sections 17 and 18 from above, whereas the second exhaust duct cover segment 23*b* covers the upstream and downstream exhaust duct sections 17 and 18 from below. The first exhaust duct cover segment 23*a* has an opening through which the $CO_2$ sensor 19 protrudes.

As illustrated in FIGS. 3 and 5, the first muffler cover 21, which covers the first muffler 15, includes two muffler cover segments 24 opposite to each other across the diameter of the first muffler 15. The first muffler cover 21 for the present embodiment includes a pair of upper and lower muffler cover segments 24 opposite to each other across the diameter of the first muffler 15.

The description below assumes that the first muffler cover 21 includes a first muffler cover segment 24*a* and a second muffler cover segment 24*b*.

Figure 6:
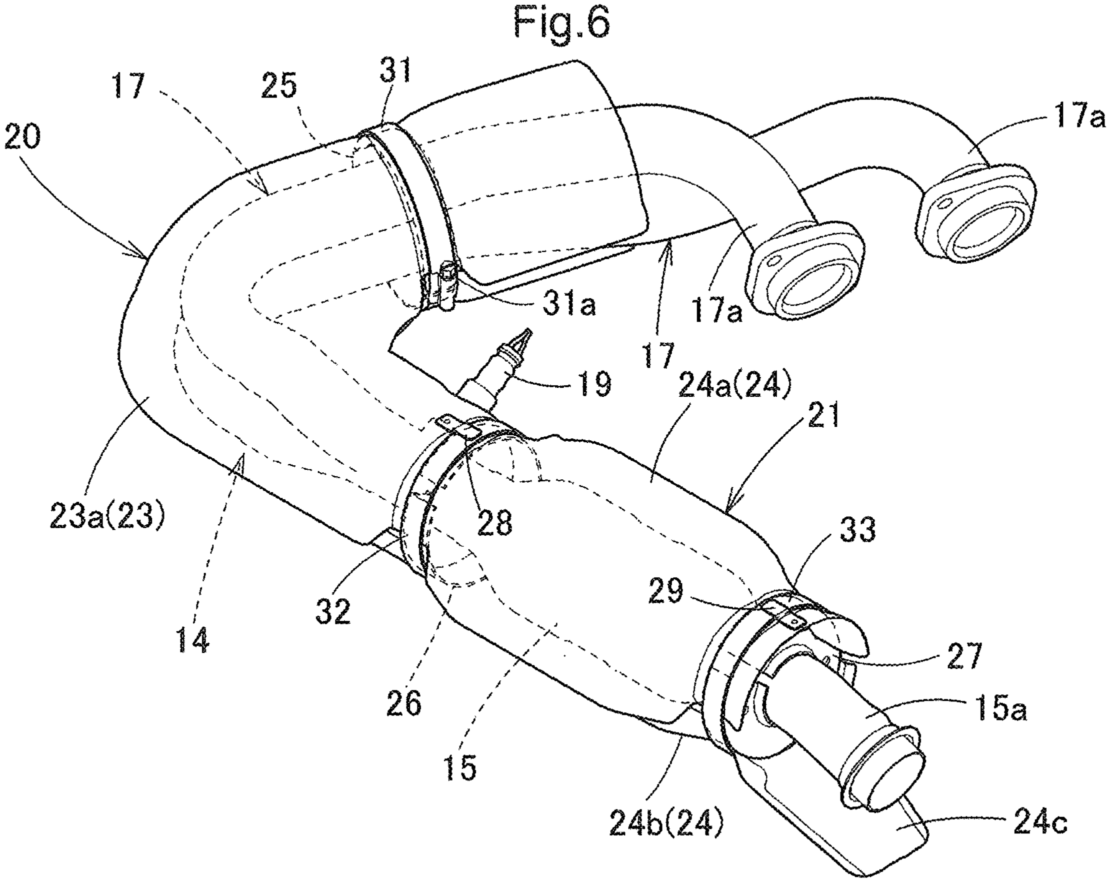
FIG. 6 is a perspective view of a first exhaust duct cover segment and a second exhaust duct cover segment as attached.

As illustrated in FIG. 3, the first muffler cover segment 24*a* covers the first muffler 15 from above, whereas the second muffler cover segment 24*b* covers the first muffler 15 from below. As illustrated in FIGS. 3, 5, and 6, the first muffler 15 includes an exhaust port 15*a*, and the second muffler cover segment 24*b* has a back portion provided with an exhaust port cover 24*c* integral with the second muffler cover segment 24*b* and covering the exhaust port 15*a* from below.

As illustrated in FIG. 4, the first muffler cover segment 24*a* is integral with the first exhaust duct cover segment 23*a*, whereas the second muffler cover segment 24*b* is integral with the second exhaust duct cover segment 23*b*.

The exhaust duct cover 20 and the first muffler cover 21 are attached respectively to the exhaust duct 14 and the first muffler 15 on the basis of a structure illustrated in drawings such as FIG. 5.

The motor section 10, as illustrated in FIG. 5, includes a first support 25 attached to the upstream exhaust duct sections 17, a second support 26 attached to the downstream exhaust duct section 18, and a third support 27 attached to the exhaust port 15*a* of the first muffler 15.

Specifically, as illustrated in FIGS. 3 and 6, the first support 25 is a ring around the respective intermediate portions 17*c* of the upstream exhaust duct sections 17. The first support 25 includes two arch-shaped first support segments including respective couplers 25*a* welded to the intermediate portions 17*c*, so that the first support 25 is held by the upstream exhaust duct sections 17 with use of the couplers 25*a*.

Figure 7:
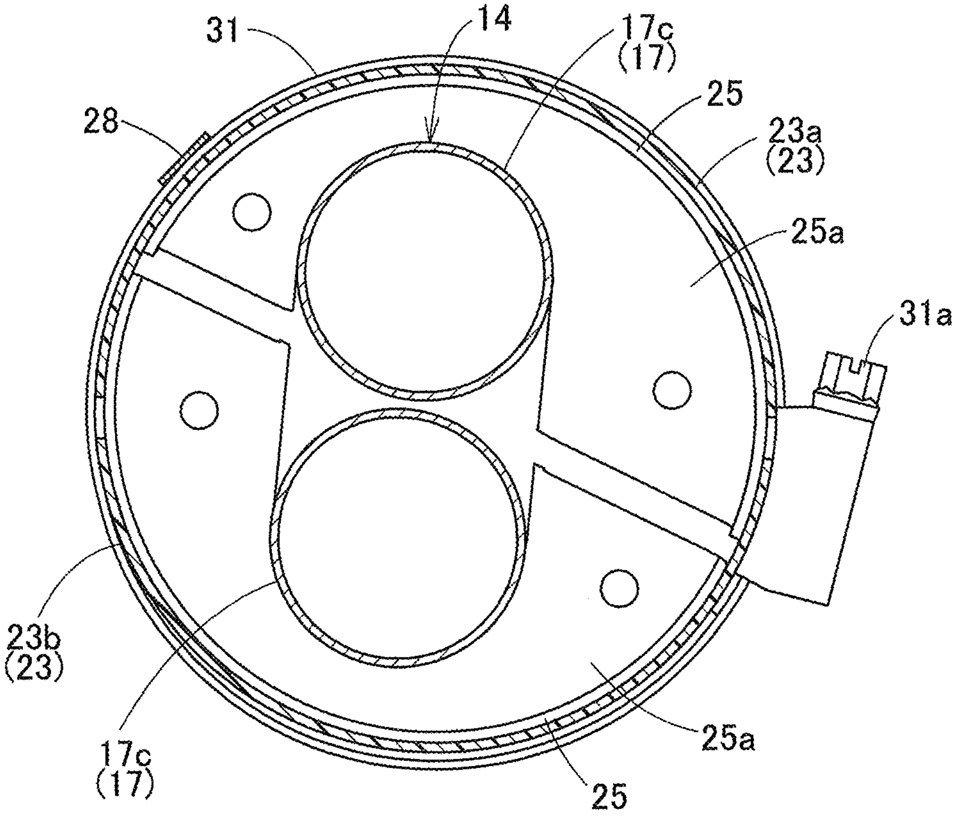
FIG. 7 is a cross-sectional view taken along line VII-VII in FIG. 2.

As illustrated in FIGS. 4 and 7, the second support 26 is a ring around the downstream exhaust duct section 18, and includes two arch-shaped second support segments including respective couplers 26*a* welded to the downstream exhaust duct section 18, so that the second support 26 is held by the downstream exhaust duct section 18 with use of the couplers 26*a*.

Figure 9:
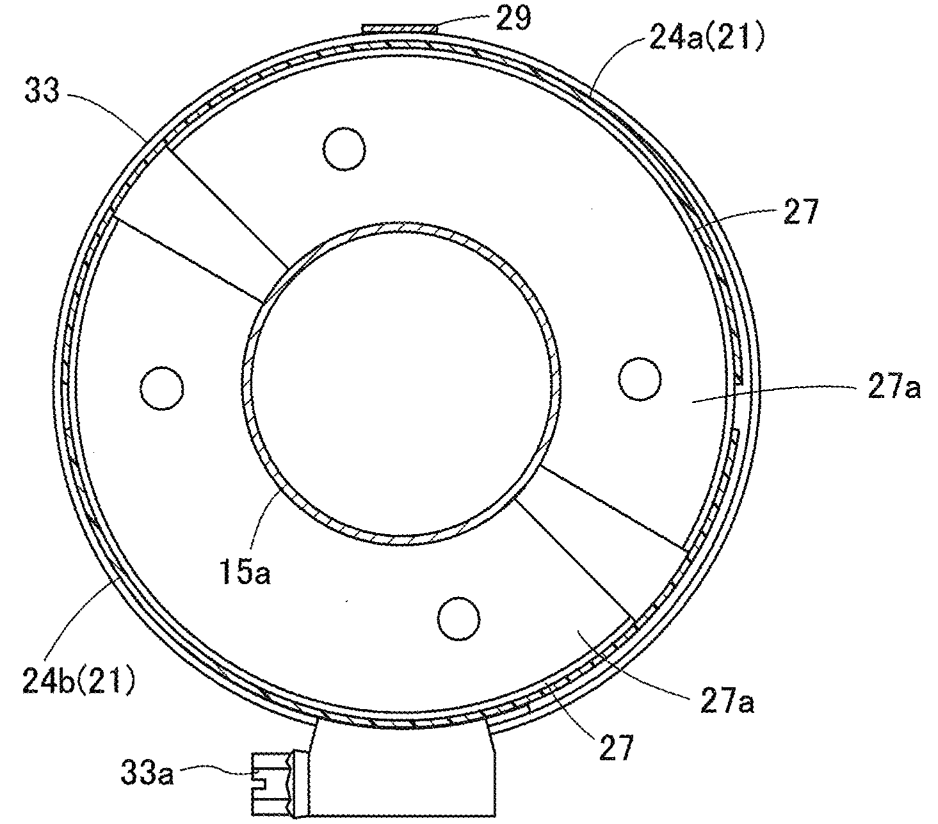
FIG. 9 is a cross-sectional view taken along line IX-IX in FIG. 2.

As illustrated in FIGS. 4 and 9, the third support 27 is a ring around the exhaust port 15*a* of the first muffler 15, and includes two arch-shaped third support segments including respective couplers 27*a* welded to the exhaust port 15*a*, so that the third support 27 is held by the first muffler 15 with use of the couplers 27*a*.

As illustrated in FIGS. 2 and 3, the motor section 10 includes a first fastening band 31 and a second fastening band 32 each serving to attach the exhaust duct cover 20 to the exhaust duct 14 and a third fastening band 33 serving to attach the first muffler cover 21 to the first muffler 15. The exhaust duct cover 20 and the first muffler cover 21 are attached respectively to the exhaust duct 14 and the first muffler 15 as illustrated in FIGS. 2, 3, 7, 8, and 9.

Specifically, the first exhaust duct cover segment 23*a* is placed above the upstream exhaust duct sections 17 and the downstream exhaust duct section 18 to bring an inner side portion into contact with the first and second supports 25 and 26, so that the first exhaust duct cover segment 23*a* is supported by the first and second supports 25 from inward. The second exhaust duct cover segment 23*b* is placed below the upstream exhaust duct sections 17 and the downstream exhaust duct section 18 to bring an inner side portion into contact with the first and second supports 25 and 26, so that the second exhaust duct cover segment 23*b* is supported by the first and second supports 25 from inward.

Figure 8:
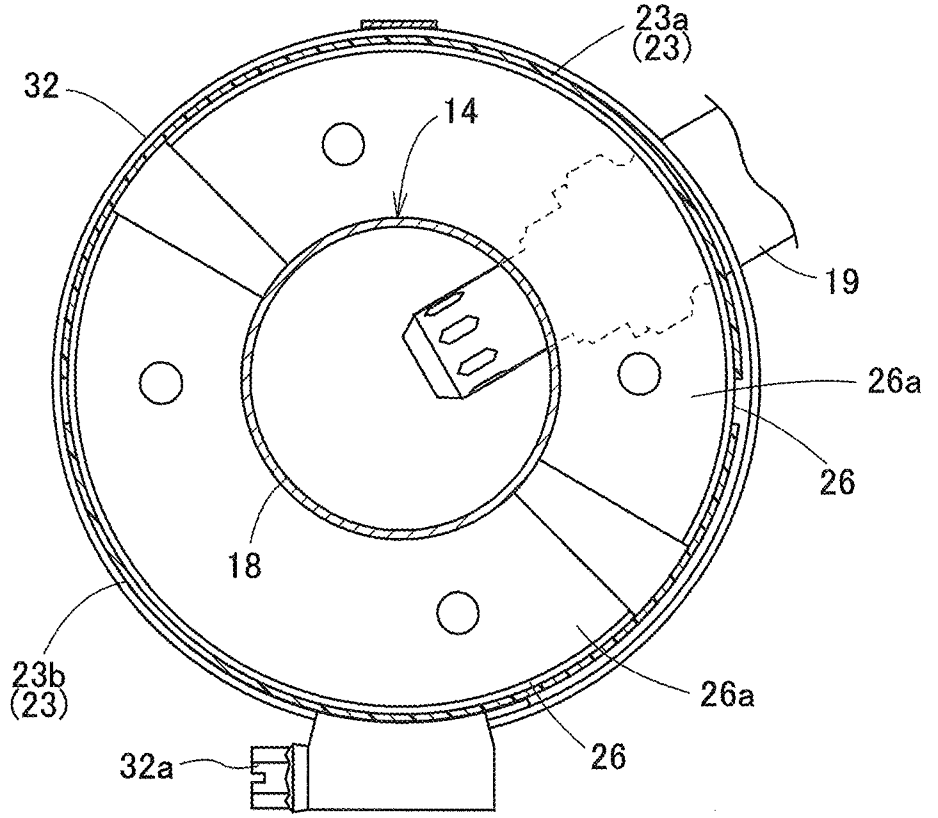
FIG. 8 is a cross-sectional view taken along line VIII-VIII in FIG. 2.

As illustrated in FIG. 7, the first fastening band 31 is fitted around respective portions of the first and second exhaust duct cover segments 23*a* and 23*b* which portions correspond to the first support 25 and is fastened with use of a fastening screw 31*a* to fix the first and second exhaust duct cover segments 23*a* and 23*b* to the first support 25. As illustrated in FIG. 8, the second fastening band 32 is fitted around respective portions of the first and second exhaust duct cover segments 23*a* and 23*b* which portions correspond to the second support 26 and is fastened with use of a fastening screw 32*a* to fix the first and second exhaust duct cover segments 23*a* and 23*b* to the second support 26. The exhaust duct cover 20 is attached to the exhaust duct 14 with use of the first and second fastening bands 31 and 32 and the first and second supports 25 and 26. As illustrated in FIGS. 6, 7, and 8, the first exhaust duct cover segment 23*a* is provided with two fixing members 28 for fixing the respective first and second fastening bands 31 and 32 from outward to prevent displacement.

The first muffler cover segment 24*a* is placed above the first muffler 15 to bring an inner side portion into contact with the third support 27, so that the first muffler cover segment 24*a* is supported by the third support 27 from inward. This placement is simultaneous with the placement of the first exhaust duct cover segment 23*a* above the upstream exhaust duct sections 17 and the downstream exhaust duct section 18 to be supported by the first and second supports 25 and 26.

The second muffler cover segment 24*b* is placed below the first muffler 15 to bring an inner side portion into contact with the third support 27, so that the second muffler cover segment 24*b* is supported by the third support 27 from inward. This placement is simultaneous with the placement of the second exhaust duct cover segment 23*b* below the upstream exhaust duct sections 17 and the downstream exhaust duct section 18 to be supported by the first and second supports 25 and 26.

As illustrated in FIGS. 2, 3, and 9, the third fastening band 33 is fitted around respective portions of the first and second muffler cover segments 24*a* and 24*b* which portions correspond to the third support 27 and is fastened with use of a fastening screw 33*a* (see FIG. 8) to fix the first and second muffler cover segments 24*a* and 24*b* to the third support 27. The first muffler cover 21 is attached to the first muffler 15 with use of the second and third fastening bands 32 and 33 and the second and third supports 26 and 27. As illustrated in FIGS. 6 and 9, the first muffler cover segment 24*a* is provided with a fixing member 29 for fixing the third fastening band 33 from outward to prevent displacement.

Second Muffler Cover

Figure 10:
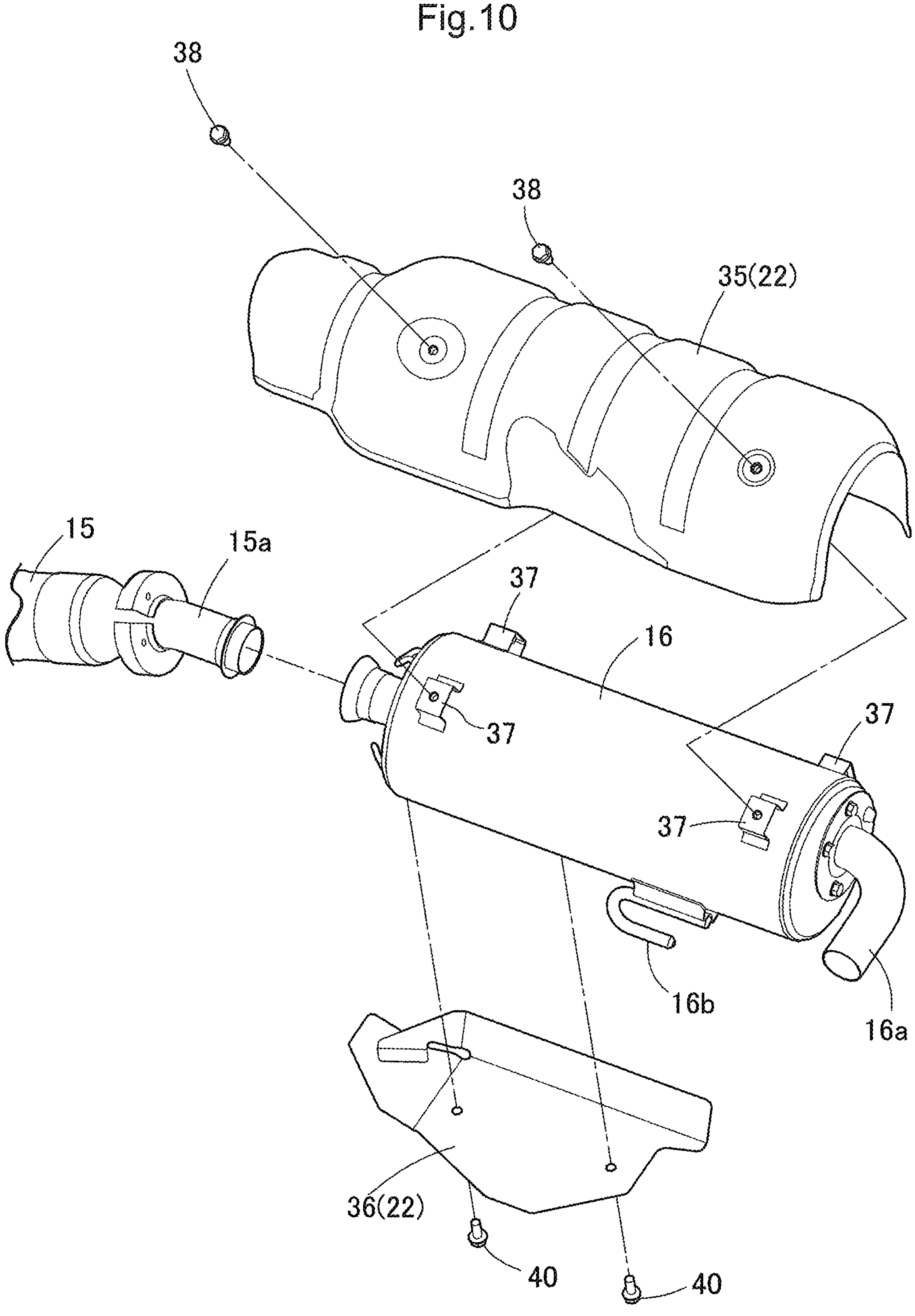
FIG. 10 is a perspective view of an upper cover segment and a lower cover segment as detached.

As illustrated in FIG. 10, the second muffler cover 22, which covers the second muffler 16, includes an upper cover segment 35 and a lower cover segment 36.

Figure 12:
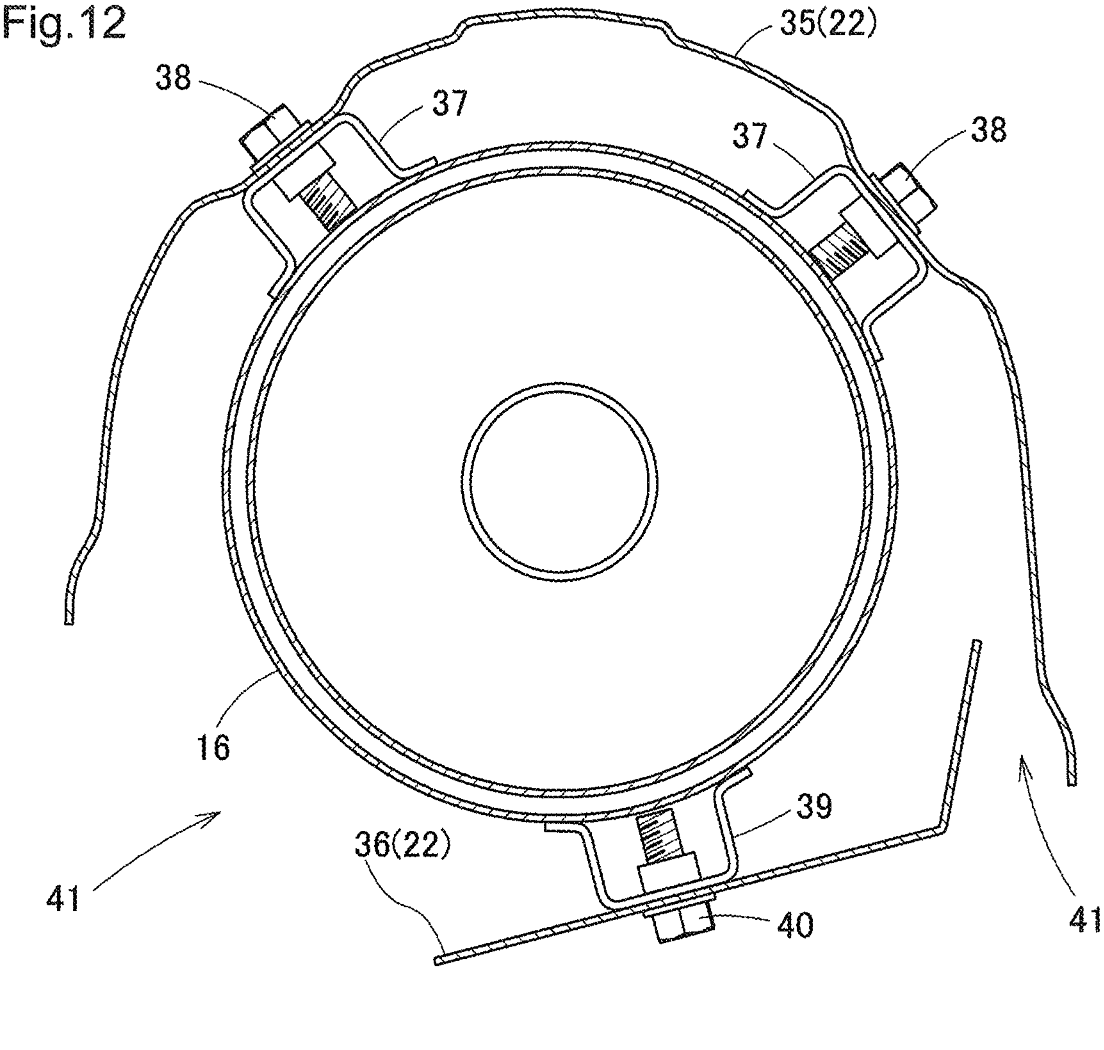
FIG. 12 is a cross-sectional view taken along line XIII-XIII in FIG. 2.

As illustrated in FIGS. 11 and 12, the upper cover segment 35 extends circumferentially around an upper portion of the second muffler 16. As illustrated in drawings such as FIGS. 10 and 12, the second muffler 16 has an upper circumferential portion provided with two or more upper cover supports 37 to which the upper cover segment 35 is attached with use of respective coupling bolts 38. The upper cover segment 35 is held by the second muffler 16 in such a manner as to cover an upper portion of the second muffler 16.

As illustrated in FIGS. 3 and 12, the lower cover segment 36 is below a lower portion of the second muffler 16. As illustrated in drawings such as FIGS. 10 and 12, the second muffler 16 has a lower circumferential portion provided with two or more lower cover supports 39 to which the lower cover segment 36 is attached with use of respective coupling bolts 40. The lower cover segment 36 is held by the second muffler 16 in such a manner as to cover a lower portion of the second muffler 16.

As illustrated in FIG. 12, the upper and lower cover segments 35 and 36 are separately attached to the second muffler 16 with gaps 41 between the upper and lower cover segments 35 and 36 which gaps 41 serve to let heat dissipated by the second muffler 16 escape from the second muffler cover 22.

As illustrated in FIG. 2, the upper cover segment 35 has a length L1 along the length of the second muffler 16, whereas the second muffler 16 has a length L2, the length L1 being larger than the length L2. The lower cover segment 36 has a length L3 along the length of the second muffler 16 which length L3 is smaller than the length L2. The upper cover segment 35 covers the second muffler 16 over its entire length, whereas the lower cover segment 36 covers the second muffler 16 over a length smaller than the entire length of the second muffler 16.

As illustrated in FIG. 2, the lower cover segment 36 corresponds in position to a portion of the second muffler 16 which portion is between its lengthwise center C and its front end. The lower cover segment 36 covers a front end portion of the second muffler 16 from below which front end portion tends to be heated by exhaust gas from the engine 11.

Alternative Embodiments (1) The embodiment described above is configured such that the first and second exhaust duct cover segments 23*a* and 23*b* are integral respectively with the first and second muffler cover segments 24*a* and 24*b*. The present invention is, however, not limited to such a configuration: The first and second exhaust duct cover segments 23*a* and 23*b* may be separate respectively from the first and second muffler cover segments 24*a* and 24*b*.

(2) The embodiment described above is configured such that the first exhaust duct cover segment 23*a* covers the upstream and downstream exhaust duct sections 17 and 18 from above, whereas the second exhaust duct cover segment 23*b* covers the upstream and downstream exhaust duct sections 17 and 18 from below and that the first muffler cover segment 24*a* covers the first muffler 15 from above, whereas the second muffler cover segment 24*b* covers the first muffler 15 from below. The first and second exhaust duct cover segments 23*a* and 23*b* may alternatively cover the upstream and downstream exhaust duct sections 17 and 18 sideways. The first and second muffler cover segments 24*a* and 24*b* may alternatively cover the first muffler 15 sideways.

(3) The embodiment described above is configured such that the first muffler 15 serves to clean exhaust gas. The present invention is, however, not limited to such a configuration: The first muffler 15 may serve to muffle exhaust noise.

(4) The embodiment described above includes two upstream exhaust duct sections 17. The present invention is, however, not limited to such a configuration: The number of upstream exhaust duct sections 17 may be three or more.

(5) The embodiment described above is configured such that the upstream exhaust duct sections 17 are arranged vertically relative to the body. The upstream exhaust duct sections 17 may alternatively be arranged lengthwise or widthwise relative to the body.

(6) The embodiment described above includes a second muffler cover 22, but may alternatively exclude the second muffler cover 22.

(7) The exhaust duct cover 20 covers a portion of the exhaust duct 14 which portion is downstream of respective intermediate portions of the upstream exhaust duct sections 17.

INDUSTRIAL APPLICABILITY

The present invention is applicable to any utility vehicle including a cargo box, an engine below the cargo box, and an exhaust duct including (i) two or more upstream exhaust duct sections each extending from an exhaust section of the engine widthwise relative to the vehicle body and (ii) a downstream exhaust duct section disposed backward of the upstream exhaust duct sections, extending lengthwise relative to the vehicle body, and merging the upstream exhaust duct sections with each other.

| Reference Signs List | |
|---|---|
| 9 | Cargo box |
| 11 | Engine |
| 11a | Exhaust section |
| 14 | Exhaust duct |
| 15 | First muffler (muffler) |
| 15a | Exhaust port |
| 17 | Upstream exhaust duct section |
| 18 | Downstream exhaust duct section |
| 20 | Exhaust duct cover |
| 21 | First muffler cover (muffler cover) |
| 23 | Exhaust duct cover segment |
| 24 | Muffler cover segment |
| 25 | First support |
| 26 | Second support |
| 27 | Third support |
| 31 | First fastening band |
| 32 | Second fastening band |
| 33 | Third fastening band |

The invention claimed is:

1. A utility vehicle, comprising:

a body of the utility vehicle;

a cargo box at a back portion of the body;

an engine below the cargo box;

an exhaust duct comprising:

a plurality of upstream exhaust duct sections each extending from an exhaust section of the engine along a width of the body of the vehicle; and a downstream exhaust duct section disposed rearward of the plurality of upstream exhaust duct sections, the downstream exhaust duct section extending in a front-back direction of the vehicle relative to the body of the vehicle, and merging the plurality of upstream exhaust duct sections with each other, wherein the exhaust duct is configured to discharge exhaust gas from the engine;

an exhaust duct cover covering both the plurality of upstream exhaust duct sections and the downstream exhaust duct section and comprising two exhaust duct cover segments opposite to each other across a diameter of each of the plurality of upstream exhaust duct sections and the downstream exhaust duct section;

a first support attached to the plurality of upstream exhaust duct sections and supporting the exhaust duct cover segments from within the exhaust duct cover;

a second support attached to the downstream exhaust duct section and supporting the exhaust duct cover segments from within the exhaust duct cover;

a first fastening band around respective portions of the exhaust duct cover segments which correspond to a location of the first support, the first fastening band fastening the exhaust duct cover segments to the first support;

a second fastening band around respective portions of the exhaust duct cover segments which correspond to a location of the second support, the second fastening band fastening the exhaust duct cover segments to the second support;

a muffler connected to the downstream exhaust duct section; and a muffler cover covering the muffler and including two muffler cover segments.

2. The utility vehicle according to claim 1, wherein:

a first one of the muffler cover segments is integral with a first one of the exhaust duct cover segments, and a second one of the muffler cover segments is integral with a second one of the exhaust duct cover segments.

3. The utility vehicle according to claim 1, further comprising: a third support attached to an exhaust port of the muffler and supporting the two muffler cover segments from within the muffler cover; and a third fastening band around respective portions of the muffler cover segments which correspond to a location of the third support, the third fastening band fastening the two muffler cover segments to the third support.

4. The utility vehicle according to claim 1, wherein:

a first one of the exhaust duct cover segments covers the plurality of upstream exhaust duct sections and the downstream exhaust duct section from above, and a second one of the exhaust duct cover segments covers the plurality of upstream exhaust duct sections and the downstream exhaust duct section from below.

5. The utility vehicle according to claim 1, wherein:

the plurality of upstream exhaust duct sections are arranged vertically.

6. The utility vehicle according to claim 1, wherein:

the muffler is configured to clean the exhaust gas.

7. The utility vehicle according to claim 1, wherein:

the exhaust duct cover covers a portion of the exhaust duct which portion is downstream of respective intermediate portions of the plurality of upstream exhaust duct sections.

* * * * *